US008641814B2

(12) United States Patent
Murphy

(10) Patent No.: US 8,641,814 B2
(45) Date of Patent: Feb. 4, 2014

(54) NATURAL OIL BASED MARKING COMPOSITIONS AND THEIR METHODS OF MAKING

(75) Inventor: Timothy A. Murphy, Yorkville, IL (US)

(73) Assignee: Elevance Renewable Sciences, Inc., Woodridge, IL (US)

(*) Notice: Subject to any disclaimer, the term of this patent is extended or adjusted under 35 U.S.C. 154(b) by 230 days.

(21) Appl. No.: 13/101,515

(22) Filed: May 5, 2011

(65) Prior Publication Data
US 2011/0277661 A1 Nov. 17, 2011

Related U.S. Application Data

(60) Provisional application No. 61/333,814, filed on May 12, 2010.

(51) Int. Cl.
*C09D 13/00* (2006.01)
(52) U.S. Cl.
USPC ..................... 106/31.07; 106/31.09
(58) Field of Classification Search
USPC .......................................... 106/31.07, 31.09
See application file for complete search history.

(56) References Cited

U.S. PATENT DOCUMENTS

| | | | |
|---|---|---|---|
| 1,935,946 A | 11/1933 | Egan et al. | |
| 1,954,659 A | 4/1934 | Will | |
| 2,468,799 A | 5/1949 | Ziels et al. | |
| 2,784,891 A | 3/1957 | Thielke | |
| 3,448,178 A | 6/1969 | Flanagan | |
| 3,630,697 A | 12/1971 | Duling et al. | |
| 3,645,705 A | 2/1972 | Miller et al. | |
| 3,744,956 A | 7/1973 | Hess | |
| 3,844,706 A | 10/1974 | Tsaras | |
| 3,957,495 A * | 5/1976 | Teranishi et al. ........... 106/31.16 |
| 4,118,203 A | 10/1978 | Beardmore et al. | |
| 4,134,718 A | 1/1979 | Kayfetz et al. | |
| 4,292,088 A | 9/1981 | Scheuffgen et al. | |
| 4,293,345 A | 10/1981 | Zeilstra et al. | |
| 4,314,915 A | 2/1982 | Wiegers et al. | |
| 4,390,590 A | 6/1983 | Saunders et al. | |
| 4,411,829 A | 10/1983 | Schulte-Elte et al. | |
| 4,434,306 A | 2/1984 | Kobayashi et al. | |
| 4,507,077 A | 3/1985 | Sapper | |
| 4,545,941 A | 10/1985 | Rosenburg | |
| 4,554,107 A | 11/1985 | Takao | |
| 4,567,548 A | 1/1986 | Schneeberger | |
| 4,608,011 A | 8/1986 | Comstock | |
| 4,614,625 A | 9/1986 | Wilson | |
| 4,623,488 A | 11/1986 | Takao | |
| 4,714,496 A | 12/1987 | Luken, Jr. et al. | |
| 4,759,709 A | 7/1988 | Luken, Jr. et al. | |
| 4,813,975 A | 3/1989 | Poulina et al. | |
| 4,842,648 A | 6/1989 | Phadoemchit et al. | |
| 4,855,098 A | 8/1989 | Taylor | |
| 4,923,708 A | 5/1990 | Given, Jr. | |
| 4,990,013 A * | 2/1991 | Hejmanowski ................. 401/49 |
| 5,171,329 A | 12/1992 | Lin | |
| 5,258,197 A | 11/1993 | Wheeler et al. | |
| 5,338,187 A | 8/1994 | Elharar | |
| 5,380,544 A | 1/1995 | Klemann et al. | |
| 5,453,120 A | 9/1995 | Rendino et al. | |
| 5,578,089 A | 11/1996 | Elsamaloty | |
| 5,660,865 A | 8/1997 | Pedersen et al. | |
| 5,700,516 A | 12/1997 | Sandvick et al. | |
| 5,716,434 A * | 2/1998 | Koyama ..................... 106/31.11 |
| 5,723,137 A | 3/1998 | Wahle et al. | |
| 5,753,015 A | 5/1998 | Sinwald et al. | |
| 5,843,194 A | 12/1998 | Spaulding | |
| 5,885,600 A | 3/1999 | Blum et al. | |
| 5,888,487 A | 3/1999 | Baumoeller et al. | |
| 6,001,286 A | 12/1999 | Sleeter | |
| 6,019,804 A | 2/2000 | Requejo et al. | |
| 6,022,402 A | 2/2000 | Stephenson et al. | |
| 6,063,144 A | 5/2000 | Calzada et al. | |
| 6,099,877 A | 8/2000 | Schuppan | |

(Continued)

FOREIGN PATENT DOCUMENTS

DE  19956226  5/2001
EP  0536861 A1  4/1993

(Continued)

OTHER PUBLICATIONS

Behren et al., "Beeswax and other Non-Paraffin Waxes," Presented at NCA Technical Meeting, Jun. 19-20, 1991, 6 pages.
Bell et al., "Sperm Oil Replacements: Synthetic Wax Esters from Selectively Hydrogenated Soybean and Linseed Oils," Journal of the American Chemical Society, Jun. 1997, vol. 54, pp. 259-263.
Erhan et al., "Drying Properties of Metathesized Soybean Oil," Journal of American Oil Chemists' Society, AOCS Press, vol. 74, No. 6, 1997, pp. 703-706.
Frahm, "Harvest Lights: The only soy-based candle, a bright idea," available at http://www.extension.uiuc.edu/~stratsoy/new/news/html/909166253,html, Oct. 23, 1998, 2 pages.

(Continued)

*Primary Examiner* — Kaj K Olsen
*Assistant Examiner* — Veronica F Faison
(74) *Attorney, Agent, or Firm* — Brinks, Gilson & Lione

(57) ABSTRACT

Natural oil based marking compositions and their methods of making are provided. The compositions comprise a lipid-based wax having approximately 0-90 percent by weight triacylglycerides and approximately 10-99 percent by weight monoacylglycerides and diacylglycerides combined. The compositions also comprise approximately 1-40 percent by weight of a structuring agent. The methods comprise blending the composition by heating the lipid-based wax and structuring agent at a sufficiently high temperature to destroy substantially all crystal structure within the lipid-based wax. The methods further comprise pouring the composition into a mold having a surface and a core, wherein the pouring is conducted at a temperature at least 5° C. greater than the congeal point of the lipid-based wax. The methods further comprise cooling the lipid-based wax under conditions sufficient to cool the core to at least 5° C. below the congeal point of the lipid-based wax in approximately 30-90 minutes.

28 Claims, No Drawings

(56) References Cited

U.S. PATENT DOCUMENTS

| | | | |
|---|---|---|---|
| 6,103,308 | A | 8/2000 | Floyd et al. |
| 6,106,597 | A | 8/2000 | Starks et al. |
| 6,123,979 | A | 9/2000 | Hepburn et al. |
| 6,127,326 | A | 10/2000 | Dieckmann et al. |
| 6,132,742 | A | 10/2000 | Le Bras et al. |
| 6,156,369 | A | 12/2000 | Eger et al. |
| 6,201,053 | B1 | 3/2001 | Dieckmann et al. |
| 6,214,918 | B1 | 4/2001 | Johnson et al. |
| 6,224,641 | B1 | 5/2001 | Matzat et al. |
| 6,238,926 | B1 | 5/2001 | Liu et al. |
| 6,255,375 | B1 | 7/2001 | Michelman |
| 6,258,965 | B1 | 7/2001 | O'Lenick, Jr. |
| 6,262,153 | B1 | 7/2001 | Webster et al. |
| 6,276,925 | B1 | 8/2001 | Varga |
| 6,277,310 | B1 | 8/2001 | Sleeter |
| 6,284,007 | B1 | 9/2001 | Tao |
| 6,497,735 | B2 | 12/2002 | Tao |
| 6,503,077 | B2 | 1/2003 | Orth et al. |
| 6,503,285 | B1 | 1/2003 | Murphy |
| 6,582,748 | B1 | 6/2003 | Loh et al. |
| 6,586,506 | B2 | 7/2003 | Webster et al. |
| 6,599,334 | B1 | 7/2003 | Anderson |
| 6,645,261 | B2 | 11/2003 | Murphy et al. |
| 6,673,763 | B1 | 1/2004 | Hansen et al. |
| 6,730,137 | B2 | 5/2004 | Pesu et al. |
| 6,733,548 | B2 | 5/2004 | Rasmussen et al. |
| 6,758,869 | B2 | 7/2004 | Roeske et al. |
| 6,770,104 | B2 | 8/2004 | Murphy |
| 6,773,469 | B2 | 8/2004 | Murphy |
| 6,797,020 | B2 | 9/2004 | Murphy |
| 6,824,572 | B2 | 11/2004 | Murphy |
| 6,846,573 | B2 | 1/2005 | Seydel |
| 6,852,140 | B1 | 2/2005 | Roeske |
| 6,943,262 | B2 | 9/2005 | Kodali et al. |
| 7,037,439 | B2 | 5/2006 | Tavares |
| 7,128,766 | B2 | 10/2006 | Murphy et al. |
| 7,176,171 | B2 | 2/2007 | Nieendick et al. |
| 7,192,457 | B2 | 3/2007 | Murphy et al. |
| 7,217,301 | B2 | 5/2007 | Murphy et al. |
| 7,387,649 | B2 | 6/2008 | Tao |
| 7,462,205 | B2 | 12/2008 | Murphy |
| 7,510,584 | B2 | 3/2009 | Cap |
| 7,569,084 | B2 | 8/2009 | Tao et al. |
| 7,588,607 | B1 | 9/2009 | Cap |
| 7,601,184 | B2 | 10/2009 | Tischendorf |
| 7,637,968 | B2 | 12/2009 | Murphy |
| 2001/0013195 | A1 | 8/2001 | Tao |
| 2001/0051680 | A1 | 12/2001 | Webster et al. |
| 2002/0005007 | A1 | 1/2002 | Roeske et al. |
| 2002/0144455 | A1 | 10/2002 | Bertrand et al. |
| 2002/0157303 | A1 | 10/2002 | Murphy et al. |
| 2003/0008257 | A1 | 1/2003 | Tao |
| 2003/0017431 | A1 | 1/2003 | Murphy |
| 2003/0022121 | A1 | 1/2003 | Biggs |
| 2003/0046860 | A1 | 3/2003 | Tiffany et al. |
| 2003/0057599 | A1 | 3/2003 | Murphy et al. |
| 2003/0061760 | A1 | 4/2003 | Tao et al. |
| 2003/0091949 | A1 | 5/2003 | Pesu et al. |
| 2003/0110683 | A1 | 6/2003 | Murphy |
| 2003/0134244 | A1 | 7/2003 | Gray et al. |
| 2003/0198826 | A1 | 10/2003 | Seydel |
| 2003/0207971 | A1 | 11/2003 | Stuart, Jr. et al. |
| 2003/0213163 | A1 | 11/2003 | Berger et al. |
| 2004/0000088 | A1 | 1/2004 | Wesley |
| 2004/0037859 | A1 | 2/2004 | Cecchi et al. |
| 2004/0047886 | A1 | 3/2004 | Murphy et al. |
| 2004/0076732 | A1 | 4/2004 | Valix |
| 2004/0088907 | A1 | 5/2004 | Murphy |
| 2004/0088908 | A1 | 5/2004 | Murphy |
| 2004/0138359 | A1 | 7/2004 | Dinkelaker et al. |
| 2004/0200136 | A1 | 10/2004 | Tao et al. |
| 2004/0221503 | A1 | 11/2004 | Murphy et al. |
| 2004/0221504 | A1 | 11/2004 | Murphy |
| 2005/0014664 | A1 | 1/2005 | Nadolsky et al. |
| 2005/0060927 | A1 | 3/2005 | Murphy |
| 2005/0095545 | A1 | 5/2005 | Tischendorf |
| 2005/0123780 | A1 | 6/2005 | Seydel |
| 2005/0158679 | A1 | 7/2005 | Chen et al. |
| 2005/0269728 | A1 | 12/2005 | Roos |
| 2006/0236593 | A1 | 10/2006 | Cap |
| 2006/0272199 | A1 | 12/2006 | Licciardello et al. |
| 2006/0272200 | A1 | 12/2006 | Murphy et al. |
| 2007/0006521 | A1 | 1/2007 | Licciardello et al. |
| 2007/0006522 | A1 | 1/2007 | Tao |
| 2007/0039237 | A1 | 2/2007 | Murphy et al. |
| 2007/0056211 | A1 | 3/2007 | Li et al. |
| 2007/0144058 | A1 | 6/2007 | Chen et al. |
| 2007/0151480 | A1 | 7/2007 | Bloom et al. |
| 2007/0270621 | A1 | 11/2007 | Millis et al. |
| 2007/0282000 | A1 | 12/2007 | Murphy et al. |
| 2008/0027194 | A1 | 1/2008 | Schrodi |
| 2008/0064891 | A1 | 3/2008 | Lee |
| 2008/0138753 | A1 | 6/2008 | Tao et al. |
| 2008/0145808 | A1 | 6/2008 | Lee |
| 2008/0206411 | A1 | 8/2008 | Nielsen |
| 2008/0307696 | A1 | 12/2008 | Wu et al. |
| 2009/0048459 | A1 | 2/2009 | Tupy et al. |
| 2009/0119977 | A1 | 5/2009 | Murphy |
| 2009/0217568 | A1 | 9/2009 | Murphy et al. |
| 2009/0259065 | A1 | 10/2009 | Abraham et al. |
| 2009/0264672 | A1 | 10/2009 | Abraham et al. |
| 2010/0024281 | A1 | 2/2010 | Lemke et al. |
| 2010/0044924 | A1 | 2/2010 | Cap |
| 2010/0047499 | A1 | 2/2010 | Braksmayer et al. |
| 2010/0132250 | A1 | 6/2010 | Uptain et al. |
| 2010/0145086 | A1 | 6/2010 | Schrodi et al. |
| 2010/0205851 | A1 | 8/2010 | Uptain et al. |

FOREIGN PATENT DOCUMENTS

| | | |
|---|---|---|
| EP | 0545715 A1 | 6/1993 |
| EP | 0685554 A1 | 12/1995 |
| EP | 0811664 A1 | 12/1997 |
| EP | 1693436 A1 | 8/2006 |
| EP | 1696022 A1 | 8/2006 |
| EP | 1801096 A1 | 6/2007 |
| GB | 1282525 A | 7/1972 |
| JP | 56-32550 A | 4/1981 |
| JP | 04-59897 A | 2/1992 |
| JP | 06-009987 A | 1/1994 |
| JP | 09-014574 A | 1/1997 |
| JP | 2006-036768 A | 2/2006 |
| JP | 2008-045043 A | 2/2008 |
| WO | WO 92/00269 | 1/1992 |
| WO | WO 96/00815 A1 | 1/1996 |
| WO | WO 96/14373 A1 | 5/1996 |
| WO | WO 98/45390 A1 | 10/1998 |
| WO | WO 99/27043 A1 | 6/1999 |
| WO | WO 02/30386 A1 | 4/2002 |
| WO | WO 02/092736 A1 | 11/2002 |
| WO | WO 03/012016 A1 | 2/2003 |
| WO | WO 03/051134 A2 | 6/2003 |
| WO | WO 03/057983 A1 | 7/2003 |
| WO | WO 03/104348 A1 | 12/2003 |
| WO | WO 2004/033388 A1 | 4/2004 |
| WO | WO 2004/083310 A1 | 9/2004 |
| WO | WO 2004/101720 A1 | 11/2004 |
| WO | WO 2005/042655 A2 | 5/2005 |
| WO | WO 2006/041011 A1 | 4/2006 |
| WO | WO 2006/076364 A2 | 7/2006 |
| WO | WO 2007/002999 A1 | 1/2007 |
| WO | WO 2008/008420 A1 | 1/2008 |
| WO | WO 2008/010961 A2 | 1/2008 |
| WO | WO 2008/048520 A2 | 4/2008 |
| WO | WO 2008/103289 A1 | 8/2008 |
| WO | WO 2008/140468 A2 | 11/2008 |
| WO | WO 2008/151064 A1 | 12/2008 |
| WO | WO 2008/157436 A1 | 12/2008 |

OTHER PUBLICATIONS

Mol, "Applications of Olefin Metathesis in Oleochemistry: An Example of Green Chemistry," Green Chemistry, Royal Society of Chemistry, Cambridge, GB, vol. 4, 2002, pp. 5-13.

(56) References Cited

OTHER PUBLICATIONS

Noller, Chemistry of Organic Compounds, W.B. Saunders Company, $2^{nd}$ Ed., 1957, pp. 181 and 192.

Oliefabrik et al., "Paper coating", Research Disclosure Journal, Dec. 1996, 2 pages.

Orso, "New Use for Soybeans Has Bright Future," available at http://www.unitedsoybean.com/news/nr981014.htm, Oct. 14, 1998, 2 pages.

Rezaei, "Hydrogenated Vegetable Oils as Candle Wax," J. of the Am. Oil Chemists' Society, vol. 12, No. 79, pp. 1241-1247 (Dec. 2002).

Tao, "Development of Vegetable Lipid-based Candles," available at http://abe.www.ecn.purdue.edu/ABE/Research/research94/REPORT.94.Book_68.htmls, 1994, 2 pages.

In Business, "America's Shining Example of Sustainable Business," available at http://www.candleworks.org, Mar./Apr. 1998, 3 pages.

Pages from Bitter Creek Candle Supply, Inc., website (http://www.execpc.com/~bcsupply) now at http://www.candlesupply.com, available at least by Jun. 29, 2000, 9 pages.

Pages from Ecowax, Nature's Gift, Inc., website (http://nglwax.com/ecowax.htm), available at least by Jul. 5, 2000, 3 pages.

Pages from Heartland Candleworks website, available at www.candleworks.org, available at least by Feb. 11, 2000, 4 pages.

Purdue Agriculture News, Purdue May Agriculture & Natural Resources Package, available at http://purduenews.uns.purdue.edu/UNS/paks/agpak.digest.9605.html, May 1996, 3 pages.

Purdue News, "Purdue students put the 'happy' back into birthday candles," available at http://www.purdue.edu/UNS/html4ever/9611.Schweitzer.candles.html, Nov. 1996, 3 pages.

Purdue News, "Purdue students put the 'happy' back into birthday candles," available at http://www.purdue.edu/UNS/html4ever/9604.Schweitzer.candles.html, May 1996, 2 pages.

Purdue University School of Agriculture, 1998 Farm Progress Show, available at http://www.admin.ces.purdue.edu/anr/98fps/fpspix/930.html, 1998, 4 pages.

International Search Report for International Application No. PCT/US2011/035293, dated Sep. 26, 2011, 3 pages.

International Preliminary Report on Patentability for International Application No. PCT/US2011/035293, dated Nov. 13, 2012, 5 pages.

\* cited by examiner

NATURAL OIL BASED MARKING COMPOSITIONS AND THEIR METHODS OF MAKING

CROSS REFERENCE TO RELATED APPLICATIONS

This application claims the benefit of U.S. Provisional Patent Application No. 61/333,814, filed May 12, 2010, which is incorporated herein by reference.

BACKGROUND

Marking compositions, including various drawing and writing compositions are known in the art, such as crayon compositions, color pencil compositions and the like. These marking compositions, and in particular crayons compositions, are generally prepared by mixing together one or more petroleum based waxes such as water insoluble paraffin, carnauba wax, hydrocarbon waxes and the like, with, at times, fatty acids, in a molten state in a suitable combination in accordance with the quality of crayon required, adding talc to the molten mixture as a structuring agent, adding a pigment to the molten mixture as a colorant, pouring the resulting composition into a specified mold and solidifying the composition by cooling.

While these crayons are functional, petroleum-based waxes are derived from non-renewable sources. Crayon manufacturers therefore, have sought to use ingredients that are derived from renewable sources, such as natural oils, thereby lessening their reliance on non-renewable oil. This is especially important since waxes are not a major byproduct of oil production, and at times they are in short supply. In addition, by using renewable sources crayon manufacturers appeal to customers who desire environmentally friendly products.

There are fundamental differences in the inherent properties of the renewable, natural oil based saturated triglycerides when they are compared to the petroleum based straight chain aliphatic hydrocarbons that make up paraffin based crayons. Triglycerides exhibit well-documented polymorphic behavior whereas the aliphatic hydrocarbons of paraffin do not. "Polymorphism" means there are multiple crystal forms of the material that can (co)exist. In general, under rapid cooling, less stable lower melting and less molecularly dense crystals form initially, but given time and freeze-thaw cycles, the mobility of the molecules allow their rearrangement to higher melting, more stable and more molecularly dense crystal forms. This rearrangement can lead to the problems of cracking and blooming (i.e., "fat blooming") in a marking composition produced from natural oil, and in particular, a crayon composition produced from a natural oil.

Fat blooming of a crayon composition produced from natural oils, as a consequence, can result in a loss of sales and increased handling and production costs to the manufacturer. As a result, there is continuing interest in developing crayon compositions substantially free of fat bloom from natural oils and natural oil derivatives, and in some embodiments, to develop a crayon composition substantially free of fat bloom from natural oils and natural oil derivatives. By the use of natural oil based triglycerides, a cost reduction can be obtained over the use of paraffin and fatty acids, such as stearic acid, in the formation of the crayon composition.

BRIEF SUMMARY

Compositions and related methods of making are disclosed for natural oil based marking compositions.

In one embodiment, the marking composition comprises a lipid-based wax composition. The lipid-based wax composition comprises approximately 0-90 percent by weight triacylglycerides, and approximately 10-99 percent by weight monoacylglycerides and diacylglycerides combined. The marking composition further comprises 1-40 percent by weight of a structuring agent. In certain embodiments, the marking composition is substantially free of fat bloom.

In another embodiment, the marking composition comprises a lipid-based wax composition. The lipid-based wax composition comprises triacylglycerides, diacylglycerides, monoacylglycerides, and a structuring agent present in a ratio of 47-51 parts of the triacylglycerides to 19-23 parts of the monoacylglycerides and the diacylglycerides combined to 28-32 parts of the structuring agent. In certain embodiments, the marking composition is substantially free of fat bloom.

In yet another embodiment, the marking composition substantially free of fat bloom comprises a lipid-based wax composition. The lipid-based wax composition comprises approximately 0-90 percent by weight triacylglycerides, and approximately 10-99 percent by weight monoacylglycerides and diacylglycerides combined. The marking composition further comprises 1-40 percent by weight of a structuring agent. In this embodiment, the marking composition is substantially free of fat bloom when formed by the process of (a) blending the lipid-based wax composition and the structuring agent by heating the lipid-based wax composition and the structuring agent at a sufficiently high temperature to destroy substantially all crystal structure within the lipid-based wax composition, (b) pouring the lipid-based wax composition and the structuring agent into a mold having a surface and a core, wherein the pouring is conducted at a temperature at least 5° C. greater than the congeal point of the lipid-based wax composition, therein forming a molded wax; (c) cooling the mold under conditions sufficient to cool the core of the mold to at least 5° C. below the congeal point of the lipid-based wax composition in approximately 30-90 minutes, forming a solid marking composition substantially free of fat bloom; and (d) removing the solid marking composition from the mold.

In another embodiment, a method of making a marking composition that is substantially free of fat bloom comprises providing a lipid-based wax composition having approximately 0-90 percent by weight triacylglycerides, and approximately 10-99 percent by weight monoacylglycerides and diacylglycerides combined, and approximately 1-40 percent by weight of a structuring agent. The method further comprises blending the lipid-based wax composition and the structuring agent by heating the lipid-based wax composition and the structuring agent at a sufficiently high temperature to destroy substantially all crystal structure within the lipid-based wax composition. The method further comprises pouring the lipid-based wax composition and the structuring agent into a mold or a container having a surface and a core, wherein the pouring is conducted at a temperature at least 5° C. greater than the congeal point of the lipid-based wax composition. The method further comprises cooling the mold under conditions sufficient to cool the core of the mold at least 5° C. below the congeal point of the lipid-based wax composition in approximately 30-90 minutes, forming a solid marking composition substantially free of fat bloom The method further comprises removing the solid marking composition from the mold.

In another embodiment, a method of making a marking composition that is substantially free of fat bloom comprises providing a structuring agent and a lipid-based wax composition having triacylglycerides, diacylglycerides, and monoacylglycerides, present in a ratio of 47-51 parts of the triacylglycerides to 19-23 parts of the monoacylglycerides and the diacylglycerides combined to 28-32 parts of the structuring agent. The method further comprises blending the lipid-based wax composition and the structuring agent by heating the lipid-based wax composition and the structuring agent at a sufficiently high temperature to destroy substantially all crystal structure within the lipid-based wax composition. The method further comprises pouring the lipid-based wax composition and the structuring agent into a mold or a container having a surface and a core, wherein the pouring is conducted at a temperature at least 5° C. greater than the congeal point of the lipid-based wax composition. The method further comprises cooling the mold under conditions sufficient to cool the core of the mold at least 5° C. below the congeal point of the lipid-based wax composition in approximately 30-90 minutes, forming a solid marking composition substantially free of fat bloom The method further comprises removing the solid marking composition from the mold.

DETAILED DESCRIPTION

The present application relates to marking compositions substantially free of fat bloom and methods of making marking compositions substantially free of fat bloom.

As used herein, the singular forms "a," "an," and "the" include plural referents unless the context clearly dictates otherwise. For example, reference to "a substituent" encompasses a single substituent as well as two or more substituents, and the like.

As used herein, the terms "for example," "for instance," "such as," or "including" are meant to introduce examples that further clarify more general subject matter. Unless otherwise specified, these examples are provided only as an aid for understanding the applications illustrated in the present disclosure, and are not meant to be limiting in any fashion.

As used herein, the following terms have the following meanings unless expressly stated to the contrary. It is understood that any term in the singular may include its plural counterpart and vice versa.

As used herein, the term "marking composition" may refer to a drawing, coloring, or writing instrument. In some embodiments, these marking compositions can be used to fabricate crayons, pencils, or highlighters, wherein the composition can be used to draw, write, color, or highlight on porous and non-porous substrates. In some embodiments, the marking composition comprises a lipid-based wax composition and a structuring agent. In certain embodiments, the marking composition further comprises at least one additive. In certain embodiments, the concentration of the lipid-based wax composition is at least about 15 percent by weight of the marking composition, and in some embodiments, at least about 30 percent by weight of the marking composition, and in some embodiments, at least about 45 percent by weight of the marking composition. In certain embodiments, the concentration of the structuring agent is less than about 45 percent by weight of the marking composition, and in some embodiments, at least about 35 percent by weight of the marking composition.

As used herein, the term "structuring agent" may refer to a filler or binder in a suitable amount, such as calcium carbonate, titanium dioxide, talc, silica, clay (e.g., kaolin clay), feldspar, corn starch, alumina, mica, and mixtures thereof. In certain embodiments, the fillers include talc and/or kaolin clay. In one embodiment, the structuring agent is talc. In some embodiments, the talc is about 20-40 percent by weight, about 25-35 percent by weight, or about 30 percent by weight of the marking composition. Some examples of a talc is NYTAL™ 400, which is available from The Vanderbilt Co. in Norwalk, Conn., and a coated talc sold under the tradename Mearl Talc TCA by Mearl Corporation.

As used herein, the term "lipid-based wax compositions" may refer to compositions having at least one polyol fatty acid ester component. The polyol fatty acid ester component may include a partial fatty acid ester (or "polyol partial esters") of one or more polyols and/or a polyol, which is fully esterified with fatty acids ("complete polyol fatty acid esters"). Examples of "complete polyol fatty acid esters" include triacylglycerides, propylene glycol diesters, and tetra esters of pentaerythritol. Examples of suitable "polyol partial esters" include monoacylglycerides, diacylglycerides, and sorbitan partial esters (e.g., diesters and triesters of sorbitan). In some embodiments, the polyol fatty acid ester may include from 2 to 6 carbon atoms and 2 to 6 hydroxyl groups. Examples of suitable polyol fatty acid esters include glycerol, trimethylolpropane, ethylene glycol, propylene glycol, pentaerythritol, sorbitan and sorbitol. In certain embodiments, monoacylglycerides are compounds made up of a glycerol and a fatty acid bound as an ester. Diacylglycerols are compounds made up of a glycerol and two fatty acids; each fatty acid is bound to the glycerol as an ester. Triacylglycerides are compounds made up of a glycerol and three fatty acids, each fatty acid is bound to the glycerol as an ester. Fatty acids in the polyol esters of a natural oil include saturated fatty acids, as a non-limiting example, palmitic acid (hexadecanoic acid) and stearic acid (octadecanoic acid), and unsaturated fatty acids, as a non-limiting example, oleic acid (9-octadecenoic acid), linoleic acid (9,12-octadecadienoic acid), and linolenic acid (9,12,15-octadecatrienoic acid).

In certain embodiments, the lipid-based wax composition in the marking composition is derived from natural oils. In certain embodiments, the lipid-based wax composition has a melting point between approximately 48° C. and approximately 75° C. In one embodiment, the lipid-based wax composition has a melting point between approximately 53° C. and approximately 70° C. In another embodiment, the melting point is between approximately 50° C. and approximately 65° C. In yet another embodiment, the melting point is between approximately 48° C. and approximately 65° C.

As used herein, the term "natural oil" may refer to oil derived from plants or animal sources. The "natural oil" may be fully or partially hydrogenated in some embodiments. The term "natural oil" includes natural oil derivatives, unless otherwise indicated. Examples of natural oils include, but are not limited to, vegetable oils, algae oils, animal fats, tall oils, derivatives of these oils, combinations of any of these oils, and the like. Representative non-limiting examples of vegetable oils include canola oil, rapeseed oil, coconut oil, corn oil, cottonseed oil, olive oil, palm oil, peanut oil, safflower oil, sesame oil, soybean oil, sunflower oil, linseed oil, palm kernel oil, tung oil, jatropha oil, mustard oil, camelina oil, pennycress oil, hemp oil, algal oil, and castor oil. Representative non-limiting examples of animal fats include lard, tallow, poultry fat, yellow grease, and fish oil. Tall oils are by-products of wood pulp manufacture. In certain embodiments, the natural oil may be refined, bleached, and/or deodorized.

As used herein, the term "natural oil derivatives" may refer to the compounds or mixture of compounds derived from the natural oil using any one or combination of methods known in the art. Such methods include saponification, transesterification, esterification, interesterification, hydrogenation (partial or full), isomerization, oxidation, and reduction. Representative non-limiting examples of natural oil derivatives include gums, phospholipids, soapstock, acidulated soapstock, distillate or distillate sludge, fatty acids and fatty acid alkyl ester (e.g. non-limiting examples such as 2-ethylhexyl ester), hydroxy substituted variations thereof of the natural oil.

As used herein, the term "MAG" refers to monoacylglycerides and/or monoacylglyerols, the term "DAG" refers to diacylglycerides and/or diacylglycerols, and the term "TAG" refers to triacylglycerides and/or triacylglycerols.

As used herein, the term "fat bloom" may refer to the film that forms on the surface of the marking composition ("surface fat bloom") or in homogeneities of beta ($\beta$) phase crystals that resemble a loosely packed powder within the marking composition ("internal fat bloom"). The principle of fat bloom is generally understood to be the transformation of a wax from a metastable phase to a more thermodynamically stable phase. Since fat bloom is a thermodynamically driven process, it will eventually occur in wax that is not in its most thermodynamically favored state, such as a wax composition in the beta prime ($\beta'$) phase. Although the $\beta'$ phase is not the most thermodynamically favored state, the marking composition can be designed such that the transformation of the wax from the $\beta'$ phase to $\beta'$ phase is on the order of years instead of months or days. Fat bloom can also be exacerbated by storage of a marking composition, and in particular, a crayon composition, at an elevated temperature, which can provide the necessary thermal energy for the lipid-based wax composition to undergo phase transformations. Fat crystals on the surface grow in size over time to first produce a dull appearance, with a white or light gray colored deposit on the surface, relative to what was once a glossy surface. Before the white deposit becomes visible, the product usually becomes dull and hazy having lost the high gloss surface. Although texture of the overall product may not be seriously altered by the early stages of fat bloom, the dull appearance and white deposit make it look old and stale to the consumer. Fat bloom may also exhibit itself as growths, which look like cauliflower, forming on the surface or interior of a marking composition, and in particular, a crayon composition, typically after burning it and then allowing the melt pool to re-solidify.

As used herein, the term "substantially free of fat bloom" may refer to a marking composition that has little or no internal fat blooming or surface fat blooming and any observed fat blooming does not grow larger within a specified "shelf-life" after pouring the wax into a marking composition mold, typically a crayon composition mold, having an inner diameter of 8 mm and height of 90 mm and composed of metal, wherein the wax is poured at a temperature at least 15° C. greater than the congeal point of the wax, and subsequently cooled at approximately room temperature. In certain embodiments, surface fat bloom in the marking composition, typically a crayon composition, may be determined by visual inspection by the naked eye or by x-ray diffraction. Additionally, in certain embodiments, internal fat bloom may be determined by visual inspection by the naked eye or by x-ray diffraction (after dividing the crayon composition in half). With regards to inspection by x-ray diffraction, surface or internal fat blooming is determined by the intensity of the measured peaks at specific 28 angles. In some embodiments, fat bloom is judged visually by rubbing a portion of the marking composition, typically a crayon composition, with a paper wiper and then judging the degree to which the wiped area differs in color from an unwiped area.

As used herein, the term "microvoids" may refer to internal deformations or white spots that may form due to shrinkage of the composition material, wherein the deformations are not the result of a phase transformation but may be visually similar to internal fat blooms. In certain instances, the marking composition may be substantially free of fat bloom yet exhibit microvoids under visual inspection. The difference between microvoids and fat blooming may be observed with close visual inspection and/or microscopy. These microvoids may form at the hot spot of the marking composition as it cools and their formation may be exacerbated when the wax is poured at temperatures just above its congeal point. Therefore, in certain embodiments, pouring the marking composition at a hotter temperature may reduce or eliminate the amount of microvoids formed.

As used herein, the term "shelf-life" refers to period the of time commencing with the pouring of the lipid-based wax composition into a marking composition mold, and in particular, a crayon composition mold to the point at which the mold develops visible surface or internal fat bloom. In certain embodiments, the shelf-life of the marking composition, and in particular, a crayon composition, is at least one month, six months, one year, or two years when stored at a temperature of approximately 21° C. or less, approximately 27° C. or less, or approximately 32° C. or less.

As used herein, the term "accelerated bloom study" refers to determining whether or not the lipid-based wax composition in the marking composition exhibits surface or internal fat bloom by visual inspection after being exposed to an elevated temperature for a period of time. In other words, if the lipid-based wax composition in the marking composition is not comprised of a thermodynamically stable $\beta'$ phase, it may develop fat blooming under the certain accelerated bloom conditions. In one embodiment, the lipid-based wax may be poured into two molds, each being approximately 7.62 centimeters in diameter, approximately 3.81 centimeters in height, and weighing approximately 100 grams; wherein the lipid-based wax composition is cooled at approximately 24° C. for at least 24 hours following the pouring, therein forming two wax ingots; wherein the wax ingots are then heated in an oven at 40.5° C.±0.5° C. for approximately 4 hours. In certain embodiments, the lipid-based wax composition will be substantially free of surface or internal fat bloom by visual inspection upon removal from the oven in either of the two molds.

As used herein, the term "congeal point" may refer to the highest temperature at which the mixture of wax compositions (such as a mixture of MAGs, DAGs, and TAGs) begins to solidify. The congeal point of the lipid-based wax composition may be determined by (1) melting the wax using either a hot plate or a 50:50 ethylene glycol:water mixture bath; (2) using a bulb thermometer (in either ° F. or ° C.), stirring the melted mixture until the mercury in the thermometer has stopped rising and remains level and record this temperature; (3) stirring the melt three more times with the thermometer; (4) after the third stir, removing the thermometer from the melt at a slight angle to retain a droplet on the end or side of the bulb; (5) once a droplet is obtained, orienting the thermometer in a horizontal position and begin rotating the thermometer outwards away from the body, wherein each rotation should be no more than a 3 count (3 seconds) or less than a 2 count (2 seconds); (6) continuing to rotate the droplet until the droplet begins to turn with the thermometer; (7) recording this temperature as quickly as possible; (8) repeating steps 2-7 until two temperatures are obtained that are within 2° C. of each other; wherein the average of the two temperatures is reported as the congeal point.

As used herein, the term "dropping point," "drop point," or "melting point" are synonymous and may refer to the temperature at which a mixture of lipid-based wax compositions (such as a mixture of monoacylglycerides, diacylglycerides, and triacylglycerides) begins to melt. The melting point may be measured using ASTM D127, incorporated herein by reference.

As used herein, the term "undercooling" refers to the rapid cooling or lowering of the core temperature of the lipid-based wax composition below the composition's congeal point. In certain embodiments, the degree of undercooling in making a crayon from the lipid-based wax composition can impact the formation of fat blooming, especially when the melting temperature of one of the monoacylglyceride, diacylglyceride, or triacylglyceride components in the marking composition is comparatively lower than the others.

As used herein, the term "laydown" refers to the transfer of wax from the marking composition to a substrate, such as paper. In certain embodiments, the quality of the marking composition may be determined based upon the quality of the laydown of the composition.

Marking Compositions

In certain embodiments, the lipid-based wax of the marking compositions commonly include a polyol fatty acid ester component (made up of partial and/or completely esterified polyols), at least a portion of which have been subjected to a transesterification reaction. The transesterification reaction may be catalyzed by an enzyme or by a chemical catalyst (e.g., a basic catalyst). As used herein, transesterification refers to a chemical reaction which results either in the exchange of an acyl group between two positions of a polyol polyester (any ester compound which contains more than one ester group, typically containing from 2 to 10 carbon atoms and from 2 to 6 hydroxyl groups) or of the exchange of an acyl group in one ester compound with an acyl group in a second ester compound or a carboxylic acid.

In certain embodiments, the polyol fatty acid ester component has been subjected to an interesterification reaction, e.g., by treatment with a basic catalyst, such as a sodium alkoxide. For example, the polyol ester component may include a polyol fatty acid ester component formed by a process that comprises interesterifying a polyol fatty acid ester precursor mixture. As used herein, the term "interesterified" refers to an ester composition which has been treated in a manner that results in the exchange of at least a portion of the acyl groups in the polyol esters present with other acyl groups, and/or other esters present. The interesterification of a mixture of completely esterified polyols may be conducted on a mixture which also includes one or more polyol partial esters, e.g., a fatty acid monoacylglyceride (MAG) and/or fatty acid diacylglycerides (DAG). Due to their desirable melting characteristics, in certain embodiments, the lipid-based wax of the marking compositions having a melting point of between approximately 48° C. and approximately 75° C. can be particularly advantageous for use in forming marking compositions. In other embodiments, the melting point is between approximately 53° C. and approximately 70° C., between approximately 50° C. and approximately 65° C., or approximately 48° C. and approximately 65° C.

In certain embodiments, the lipid-based wax compositions of the marking compositions are derived from at least one natural oil. In certain embodiments, the natural oils are selected from the group consisting of canola oil, rapeseed oil, coconut oil, corn oil, cottonseed oil, olive oil, palm oil, peanut oil, safflower oil, sesame oil, soybean oil, sunflower oil, linseed oil, palm kernel oil, tung oil, jatropha oil, mustard oil, camellina oil, pennycress oil, hemp oil, algal oil, castor oil, lard, tallow, poultry fat, yellow grease, fish oil, tall oils, and mixtures thereof. In one embodiment, the MAGs, DAGs, and TAGs in the marking compositions are derived from palm oil. In another embodiment, the MAGs, DAGs, and TAGs in the marking compositions are derived from soybean oil. In some embodiments, the MAGs, DAGs, and TAGs have carbon chain lengths between 8 and 22 carbon atoms.

In one embodiment, the source of TAGs in the marking composition is SC-123, sold by Elevance Renewable Sciences, Bolingbrook, Ill., USA. In certain embodiments, the source of TAGs may be refined, bleached, and/or deodorized.

Regarding the MAGs and DAGs, in certain embodiments, the source of MAGs in the marking composition may be distilled monoacylglycerides such as Dimodan HSK, commercially available from Danisco Cultor USA, New Century, Kans., USA; Alphadim 90 PBK, commercially available from Caravan Ingredients, Lenexa, Kans., USA; or combinations thereof. In certain embodiments, the source of DAGs in the marking compositions may be distilled diacylglyerides such Trancendim 110, Trancendim 120, or Trancendim 130, commercially available from Caravan Ingredients. In another embodiment, the source of MAGs and DAGs is derived from Dur-Em 114, Dur-Em 117, Dur-Em 204, or Dur-Em 207, commercially available from Loders Croklaan, Channahon, Ill., USA; BFP 75, BFP 74, BFP 65, or BFP 64, commercially available from Caravan Ingredients; GRINDSTED® MONO-DI HP 60 commercially available from Danisco; or combinations thereof.

For the marking compositions, surface and internal fat bloom have been determined to be composition dependent. The combination of certain amounts of MAGs, DAGs, and TAGs can result in a marking composition being substantially free of fat bloom over a period of time from the marking composition formation (e.g., crayon formation).

In certain embodiments, the marking composition comprises a structuring agent. As used herein, the term "structuring agent" may refer to a filler or binder in a suitable amount, such as calcium carbonate, titanium dioxide, talc, silica, clay (e.g., kaolin clay), feldspar, corn starch, alumina, mica, and mixtures thereof. In certain embodiments, the fillers include talc and/or kaolin clay. In one embodiment, the structuring agent is talc. In some embodiments, the talc is about 20-40 percent by weight, about 25-35 percent by weight, or about 30 percent by weight of the marking composition. Some examples of a talc is NYTAL™ 400, which is available from The Vanderbilt Co. in Norwalk, Conn., and a coated talc sold under the tradename Mearl Talc TCA by Mearl Corporation.

In certain embodiments, the marking composition has approximately 0-90 percent by weight triacylglycerides, approximately 10-99 percent by weight monoacylglycerides and diacylglycerides combined, and approximately 1-40 percent by weight of a structuring compound (wherein the MAGs, DAGs, TAGs, and structuring agent add up to 100 percent). Alternatively described, the marking composition comprises 0-90 parts TAG, 10-99 parts MAG/DAG combined, and 1-40 parts structuring compound. In certain embodiments, the marking composition is substantially free of fat bloom. In some embodiments, the marking composition further comprises a colorant additive, wherein the additive is present in the amount of approximately 0.1-20 percent by weight to the MAGs, DAGs, TAGs, and structuring agent.

In certain embodiments, the marking composition has approximately 15-75 percent by weight triacylglycerides, approximately 2-75 percent by weight monoacylglycerides and diacylglycerides combined, and approximately 25-35 percent by weight of a structuring compound (wherein the MAGs, DAGs, TAGs, and structuring agent add up to 100 percent). Alternatively described, the marking composition comprises 15-75 parts TAG, 2-75 parts MAG/DAG combined, and 25-35 parts structuring compound. In certain embodiments, the marking composition is substantially free of fat bloom. In some embodiments, the marking composition further comprises a colorant additive, wherein the additive is present in the amount of approximately 1-16 percent by weight to the MAGs, DAGs, TAGs, and structuring agent.

In certain embodiments, the marking composition has approximately 40-60 by weight triacylglycerides, approximately 15-25 percent by weight monoacylglycerides and diacylglycerides combined, and approximately 25-35 percent by weight of a structuring compound (wherein the MAGs, DAGs, TAGs, and structuring agent add up to 100 percent). Alternatively described, the marking composition comprises 40-60 parts TAG, 15-25 parts MAG/DAG combined, and 25-35 parts structuring compound. In certain embodiments, the marking composition is substantially free of fat bloom. In some embodiments, the marking composition further comprises a colorant additive, wherein the additive is present in the amount of approximately 1-16 percent by weight to the MAGs, DAGs, TAGs, and structuring agent.

In certain embodiments, the marking composition has approximately 47-51 by weight triacylglycerides, approximately 19-23 percent by weight monoacylglycerides and diacylglycerides combined, and approximately 28-32 percent by weight of a structuring compound (wherein the MAGs, DAGs, TAGs, and structuring agent add up to 100 percent). Alternatively described, the marking composition comprises 47-51 parts TAG, 19-23 parts MAG/DAG combined, and 28-32 parts structuring compound. In certain embodiments, the marking composition is substantially free of fat bloom. In some embodiments, the marking composition further comprises a colorant additive, wherein the additive is present in the amount of approximately 1-16 percent by weight to the MAGs, DAGs, TAGs, and structuring agent.

In certain embodiments, by varying the types and amounts of TAGs, DAGs, and MAGs, a difference in the performance may be seen. Increasing the amount of fully hydrogenated natural oil in mixture may affect the relative hardness and ease of mold removal of the marking composition while also changing the laydown of the composition. In certain embodiments, varying the ratio of MAG/DAG to TAG may affect the fat bloom in the product. The laydown and cracking can be affected in the marking composition by varying the level of hydrogenation in the MAG/DAG composition that is used.

In certain embodiments, the marking composition may comprise 0-70 percent by weight partial hydrogenated TAG, 0-40 percent by weight fully hydrogenated TAG, and 2-100 percent by weight MAG/DAG combined. In certain embodiments, fat bloom and cracking may be decreased by the addition of 3.5 percent by weight or more of the MAG/DAG. In some embodiments, the addition of the fully hydrogenated TAG at 10 percent by weight level or more may help with the relative hardness of the marking composition also improve the laydown of the marking composition.

Additives to the Marking Composition

In certain embodiments, the marking composition may optionally comprise at least one additive selected from the group consisting of: wax-fusion enhancing additives, colorants, scenting agents, migration inhibitors, free fatty acids, surfactants, co-surfactants, emulsifiers, additional optimal wax ingredients, metals, glitter, cleanability additives, foam inhibitors, mold release agents, emollients, either individually or in combinations thereof. In certain embodiments, the additive(s) may comprise between approximately 0.1 percent by weight and approximately 45 percent by weight, 0.1 percent by weight and approximately 30 percent by weight, between approximately 0.1 percent by weight and approximately 15 percent by weight, between approximately 0.1 percent by weight and approximately 5 percent by weight, or upwards of approximately 0.1 percent by weight of the marking composition (i.e., to the combination of MAGs, DAGs, TAGs, and structuring agent(s)).

In certain embodiments, the marking composition can incorporate a wax-fusion enhancing type of additive selected from the group consisting of benzyl benzoate, dimethyl phthalate, dimethyl adipate, isobornyl acetate, cellulose acetate, glucose pentaacetate, pentaerythritol tetraacetate, trimethyl-s-trioxane, N-methylpyrrolidone, polyethylene glycols and mixtures thereof. In certain embodiments, the marking composition comprises between approximately 0.1 percent by weight and approximately 5 percent by weight of a wax-fusion enhancing type of additive.

In certain embodiments, one or more dyes or pigments (herein "colorants") may be added to the marking composition to provide the desired hue to the marking composition. If a pigment is employed for the colorant, it is typically an organic toner in the form of a fine powder suspended in a liquid medium, such as a mineral oil. It may be advantageous to use a pigment that is in the form of fine particles suspended in a natural oil, e.g., a vegetable oil such as palm or soybean oil. Optionally, the pigment may be inorganic, such as iron blue, iron oxide, zinc oxide, ultramarine blue, titanium dioxide, or a mixture thereof. The organic pigment may also be an azo, a naphthol, a dianisidine orange, a lithol, a diarylide yellow or a phthalo pigment. The pigment may be combined with a clay carrier, if desired. Dyes, either acidic or basic, can be used in the present inventive marking composition. Pigments, even in finely ground toner forms, are generally in colloidal suspension in a carrier.

The pigment can have any suitable particle size. In certain embodiments, the pigment particle size is from about 0.1 micron to about 25 microns, from about 0.3 micron to about 20 microns, or from about 0.5 micron to about 15 microns.

Examples of suitable dyes include the polymeric colorants REACTINT™ brand Bluex3LV, Orangex38, and Violetx80LT, available from the Milliken Chemical Co. in Inman, S.C. These are dark viscous liquids containing the dyes Bluex3LV, Orangex38, and Violet x 80LT.

The colorant may be present in any suitable amount. In certain embodiments, the colorant is present in an amount of about 0.1 percent by weight to about 20 percent by weight of the marking composition. In other embodiments, the colorant is present in an amount of about 1 percent by weight to about 16 percent by weight, about 3 percent by weight to about 8 percent by weight, or about 4 percent by weight to about 6 percent by weight of the marking composition. In one embodiment where a dye colorant is used, it may be included in an amount of from about 3 percent by weight to about 8 percent by weight of the marking composition.

In certain embodiments, the marking composition may contain additional ingredients such as glitter. The glitter may be of any suitable material and will generally comprise a metallic material, a nonmetallic material, or, more commonly, a reflective material coating, such as a metal coating, on a suitable substrate such as a polymer or other solid organic substrate. In certain embodiments, suitable metallic glitters include particles or flakes of aluminum, copper, silver, gold, brass, or other metals; suitable non-metallic glitters include particles or flakes of cellulose acetate, poly(ethylene terephthalate), polymethacrylate, poly(vinylbutyral), and the like; and suitable metallized glitters include coated metallized materials such as coated aluminum metallized cellulose acetate, poly(ethylene terephthalate), polymethacrylate, poly (vinylbutyral), and the like. In one embodiment, the glitter used in the marking composition is a coated aluminum metallized poly(ethylene terephthalate).

The glitter may be of any color (e.g., silver, gold, blue, red, etc.) or even a mixture of colors. If pigment is present in the marking composition, the glitter may be the same color as the pigment or a different color from the pigment. The glitter also may be of any dimensions that are suitable for use in such a composition.

The glitter may be present in any suitable amount. In certain embodiments, the glitter comprises less than about 15 percent by weight, between about 3 percent by weight and about 10 percent by weight, or between about 4 percent by weight and about 8 percent by weight of the marking composition.

The marking compositions may also include an emollient. In certain embodiments, it may be desirable to include an emollient in the marking composition to enable the marking composition to be more readily and easily transferred to a substrate through normal application of the marking composition to the substrate. The emollient thus provides a lubricant effect or slipperiness to the marking composition to facilitate the gliding of the marking composition across the surface of a substrate and to ensure a smooth laydown of the marking composition onto the substrate.

The emollient may also assist in ensuring the retention of certain other ingredients such as glitter in the marking composition transferred to the substrate. As such, in certain embodiments, the emollient is a liquid or paste at room temperature and is miscible with the other components in the composition, particularly the wax or the fatty acid. In other embodiments however, the emollient may be a solid such as a flake.

Any suitable emollient may be used in the marking composition. In certain embodiments, the emollient in the marking composition is comprised of lanolin oil or one of its derivatives, mineral oil, fatty esters, fatty acid esters, fatty alcohols, mono- and di-esters of propylene glycols, glycerol di-esters, mono- and di-esters of polyethylene glycols, petrolatum, vegetable shortenings, dimers and trimers of fatty acids, plant oils, silicones, and mixtures thereof.

Non-limiting examples of suitable lanolin derivatives include acetylated lanolin, acetylated lanolin alcohol, hydrogenated lanolin, lanolin alcohol, lanolin acids, isopropyl lanolate, lanolin wax, and hydroxylated lanolin. Non-limiting examples of suitable fatty esters and fatty acid esters include isopropyl myristate, myristyl myristate such as that marketed as LIPONATE MM by Lipo Chemicals of New Jersey, and esterified fatty acid propoxylates such as polyoxypropylene (2) myristyl ether propionate. Also suitable is tridecyl trimellitate such as that marketed as LIPONATE TDTM by Lipo Chemicals. Non-limiting examples of suitable fatty alcohols include oleyl alcohol, and suitable vegetable shortenings include KREMIT® (Armour, Omaha, Nebr.). Non-limiting examples of suitable plant oils include castor oil, coconut oil, olive oil, peanut oil, safflower oil, sesame oil, soybean oil, wheat germ oil, corn oil, avocado oil, almond oil, grape seed oil, jojoba oil, apricot kernel oil, palm oil, and sunflower seed oil. Non-limiting examples of suitable silicones include DOW-CORNING® 556, 593, and 1107 fluids (Dow-Corning, Midland, Mich.). In certain embodiments, other possible emollients include longer chain hydrocarbons, particularly alkenes, such as polyoxypropylene-polyoxyethylene block copolymers such as PLURONIC® 25R4 and PLURONIC 25R8 (BASF, Parsippany, N.J.).

The emollient may be present in any suitable amount. In certain embodiments, the emollient comprises between approximately 0.1 percent by weight and approximately 45 percent by weight, between approximately 5 percent by weight and approximately 25 percent by weight, or upwards of approximately 0.1 percent by weight of the marking composition. Excessive amounts of emollients can increase the tackiness adversely. In certain embodiments, especially the embodiments having a large amount of a soft wax, the emollient can be present in a low amount or omitted while still maintaining the desired improved laydown characteristics.

In certain embodiments, a cleanability additive may also be included in the marking composition to aid in the removal of the composition (such as with mild soap and water) from non-porous surfaces, such as table tops, counter tops, etc. In certain embodiments, the cleanability additive is selected from the group consisting of polyoxypropylene-polyoxyethylene block copolymers, polyoxyethylene alcohols, polyoxyethylene esters, polyoxyethylene ethers, and derivatives and mixtures thereof. In other embodiments, the cleanability additive is a polyoxyethylene (12) tridecyl ether or alcohol, polyoxyethylene (10) alkyl aryl ether, polyoxyethylene (40) stearate, or polyoxyethylene (20) stearyl alcohol, polyoxyethylene (40) stearate (available as LIPOPEG® 39S (Lipo Chemicals, Patterson, N.J.)) polyoxyethylene (12) tridecyl ether alcohol (available as RENEX® 30 (ICI America, Wilmington, Del.)), or mixture thereof. Certain emollients may also act as cleanability additives or aid in cleanability, such as polyoxypropylene-polyoxyethylene block copolymers, e.g., PLURONIC® 25R4 or 25R8.

The cleanability additive may be present in any suitable amount. In certain embodiments, the cleanability additive may be present in an amount from about 0.1 percent by weight to about 5 percent by weight, from about 1 percent by weight to about 4 percent by weight, or upwards of about 0.1 percent by weight of the marking composition.

In certain embodiments, processing aid additives such as foam inhibitors and mold release agents, as well as oxidation and UV stabilizers, may be incorporated into the marking composition. In certain embodiments, these additives are typically used in an amount of from about 0.01 percent by weight to about 5 percent by weight of the marking composition, and in some embodiments, in an amount of from about 0.1 percent by weight to about 1 percent by weight of the marking composition.

Non-limiting examples of suitable foam inhibitors include petroleum hydrocarbons such as FOAMKILL®. 614 (Crucible Chemical Co., Greenville, S.C.) and cetyl dimethicone. Non-limiting examples of suitable mold release agents include the Group IIA metal salts of fatty acids, particularly calcium stearate. Non-limiting examples of suitable oxidation stabilizers include sterically hindered phenols. Non-limiting examples of suitable UV stabilizers include hindered amine light stabilizers and benzotriazoles.

In other embodiments, one or more perfumes, fragrances, essences, or other aromatic oils (herein "scenting agents") may be added to the marking composition to provide the desired odor to the marking composition. In certain embodiments, the marking composition comprises between about approximately 0.1 percent by weight and approximately 15 percent by weight of the scenting agent. The coloring and scenting agents generally may also include liquid carriers that vary depending upon the type of color- or scent-imparting ingredient employed. In certain embodiments, the use of liquid organic carriers with coloring and scenting agents is preferred because such carriers are compatible with petroleum-based waxes and related organic materials. As a result, such coloring and scenting agents tend to be readily absorbed into the marking composition material.

In certain embodiments, the scenting agent may be an air freshener. In certain embodiments, the air freshener scenting agent is a liquid fragrance comprising one or more volatile organic compounds, including those commercially available from perfumery suppliers such as: IFF, Firmenich Inc., Takasago Inc., Belmay, Symrise Inc, Noville Inc., Quest Co., and Givaudan-Roure Corp. Most conventional fragrance materials are volatile essential oils. The fragrance can be a synthetically formed material, or a naturally derived oil such as oil of bergamot, bitter orange, lemon, mandarin, caraway, cedar leaf, clove leaf, cedar wood, geranium, lavender, orange, origanum, petitgrain, white cedar, patchouli, lavandin, neroli, rose, and the like.

In other embodiments, the scenting agent may be selected from a wide variety of chemicals such as aldehydes, ketones, esters, alcohols, terpenes, and the like. The scenting agent can be relatively simple in composition, or can be a complex mixture of natural and synthetic chemical components. In certain embodiments, the scented oil comprises woody/earthy bases containing exotic constituents such as sandalwood oil, civet, patchouli oil, and the like. In other embodiments, the scented oil can have a light floral fragrance, such as rose extract or violet extract. In yet other embodiments, the scented oil can be formulated to provide desirable fruity odors, such as lime, lemon, or orange.

In certain embodiments, the scenting agent can comprise a synthetic type of fragrance composition either alone or in combination with natural oils such as described in U.S. Pat. Nos. 4,314,915; 4,411,829; and 4,434,306; incorporated herein by reference in their entirety. Non-limiting examples of artificial liquid fragrances include geraniol, geranyl acetate, eugenol, isoeugenol, linalool, linalyl acetate, phenethyl alcohol, methyl ethyl ketone, methylionone, isobornyl acetate, and the like.

In certain embodiments, a "migration inhibitor" additive may be included in the marking composition to decrease the tendency of colorants, fragrance components, and/or other components of the wax from migrating to the outer surface of the marking composition, such as a crayon composition. In certain embodiments, the migration inhibitor is a polymerized alpha olefin. In certain embodiments, the polymerized alpha olefin has at least 10 carbon atoms. In another embodiment, the polymerized alpha olefin has between 10 and 25 carbon atoms. One suitable example of such a polymer is a hyper-branched alpha olefin polymer sold under the trade name Vybar® 103 polymer (mp 168° F. (circa 76° C.); commercially available from Baker-Petrolite, Sugarland, Tex., USA).

In other embodiments, the migration inhibitor may be a sorbitan triester, such as sorbitan tristearate and/or sorbitan tripalmitate, a related sorbitan triester formed from mixtures of fully hydrogenated fatty acids, and/or polysorbate triesters or monoesters such as polysorbate tristearate and/or polysorbate tripalmitate and related polysorbates formed from mixtures of fully hydrogenated fatty acids and/or polysorbate monostearate and/or polysorbate monopalmitate and related polysorbates formed from mixtures of fully hydrogenated fatty acids. The inclusion of such migration inhibitors may also decrease the propensity of colorants, fragrance components, and/or other components of the wax from migrating to the surface of the marking composition. The inclusion of these types of migration inhibitors can also enhance the flexibility of the marking composition and decrease its chances of cracking during the cooling processes that occurs in crayon formation.

In certain embodiments, the marking composition may include between approximately 0.1 percent by weight and approximately 5.0 percent by weight of a migration inhibitor. In another embodiment, the marking composition may include between approximately 0.1 percent by weight and approximately 2.0 percent by weight of a migration inhibitor.

In certain embodiments, the marking composition may include one or more free fatty acids. Examples of free fatty acids include lauric acid, myristic acid, palmitic acid, arachidic acid, palmitoleic acid, oleic acid, gadoleic acid, linoleic acid, linolenic acid and combinations thereof. In certain embodiments, the marking composition may include between approximately 0.1 percent by weight and approximately 5 percent by weight, between approximately 0.1 percent by weight and approximately 2 percent by weight, or upwards of approximately 0.1 percent by weight of a free fatty acid.

In another embodiment, the marking composition may include an additional optimal wax ingredient, including without limitation, creature waxes such as beeswax, lanolin, shellac wax, Chinese insect wax, and spermaceti, various types of plant waxes such as carnauba, candelila, Japan wax, ouricury wax, rice-bran wax, jojoba wax, castor wax, bayberry wax, sugar cane wax, and maize wax), and synthetic waxes such as polyethylene wax, Fischer-Tropsch wax, paraffin wax, chlorinated naphthalene wax, chemically modified wax, substituted amide wax, alpha olefins and polymerized alpha olefin wax.

In certain embodiments, the marking composition may include between approximately 0.1 percent by weight and approximately 25 percent by weight, between 0.1 percent by weight and approximately 10 percent by weight, or upward of approximately 0.1 percent by weight of the additional optimal wax ingredient.

In certain embodiments, the marking composition may include a surfactant. In certain embodiments, the marking composition may include between approximately 0.1 percent by weight and approximately 25 percent by weight, between approximately 0.1 percent by weight and approximately 10 percent by weight, or upward of approximately 0.1 percent by weight of a surfactant. Non-limiting examples of surfactants include: polyoxyethylene sorbitan trioleate, such as Tween 85, commercially available from Acros Organics; polyoxyethylene sorbitan monooleate, such as Tween 80, commercially available from Acros Organics and Uniqema; sorbitan tristearate, such as DurTan 65, commercially available from Loders Croklann, Grindsted STS 30 K commercially available from Danisco, and Tween 65 commercially available from Acros Organics and Uniqema; sorbitan monostearate, such as Tween 60 commercially available from Acros Organics and Uniqema, DurTan 60 commercially available from Loders Croklann, and Grindsted SMS, commercially available from Danisco; Polyoxyethylene sorbitan monopalmitate, such as Tween 40, commercially available from Acros Organics and Uniqema; and polyoxyethylene sorbitan monolaurate, such as Tween 20, commercially available from Acros Organics and Uniqema.

In additional embodiments, an additional surfactant (i.e., a "co-surfactant") may be added in order to improve the microstructure (texture) and/or stability (shelf life) of emulsified marking compositions. In certain embodiments, the marking composition may include between approximately 0.1 percent by weight and approximately 5 percent by weight of a co-surfactant. In another embodiment, the marking composition may include upward of approximately 0.1 percent by weight of a co-surfactant.

In certain embodiments, the marking composition may include an emulsifier. In certain embodiments, the emulsifier is the combination of MAGs and DAGs in the marking composition. Emulsifiers for lipid-based waxes are commonly synthesized using a base-catalyzed process, after which the emulsifiers may be neutralized. In certain embodiments, the emulsifier may be neutralized by adding organic acids, inorganic acids, or combinations thereof to the emulsifier. Non-limiting examples of organic and inorganic neutralization acids include: citric acid, phosphoric acid, hydrochloric acid, nitric acid, sulfuric acid, lactic acid, oxalic acid, carboxylic acid, as well as other phosphates, nitrates, sulfates, chlorides, iodides, nitrides, and combinations thereof.

Formation of Marking Compositions

The marking composition of the present invention can be produced using a number of different methods. In one embodiment, the marking composition is blended and heated to a molten state. In certain embodiments, the MAGs and DAGs in the lipid-based wax composition of the marking composition are blended together to form a mixture of MAGs and DAGs, followed by a second blending of the mixture of MAGs and DAGs with the TAGs. In some embodiments, before blending with the TAGs, the mixture of MAGs and DAGs are distilled. In other embodiments, the mixture of MAGs and DAGs are at least partially interesterified prior to blending with the TAGs.

Regarding the heating of the marking composition, the temperature needed to achieve this molten state should be sufficient to destroy any crystal structure within the marking composition. In certain embodiments, the marking composition is heated to a temperature greater than the congeal point of the lipid-based wax composition. In certain embodiments, the temperature is greater than approximately 65° C., 70° C., or 75° C. If any of the aforementioned additives are to be included in the marking composition formulation, these may be added to the molten wax or mixed with lipid-based wax composition and structuring agent prior to heating.

The molten wax is then solidified. For example, the molten wax can be poured into a mold, and in particular, a marking composition mold. In certain embodiments, the molten wax is poured into a mold while the wax is at a temperature greater than the congeal point of the lipid-based wax composition. In certain embodiments, the molten wax is poured at a temperature at least 5° C., 10° C., 15° C., or 20° C. greater than the congeal point of the lipid-based wax composition.

In certain embodiments, the molten wax is then cooled on a typical industrial line to solidify the wax in the shape of the marking composition mold. In certain embodiments, the "undercooling" conditions described below are used to cool the wax. In some embodiments, an industrial line would consist of a conveyor belt, with an automated filling system that the molds may travel on, and may also incorporate the use of fans to speed up the cooling of the molds on the line.

Additional additives may be added during the forming of the marking composition, including, among others, migration inhibitors, free fatty acids, additional optimal wax ingredients, surfactants, co-surfactants, emulsifiers, metals, among others, and combinations thereof, as mentioned above.

In certain embodiments, when adding multiple surfactants to the marking composition, improved wax properties are most often achieved by combining two or more surfactants belonging to the same type but differing in hydrophilic-lipophilic balance (HLB), so that an oil-in water emulsion may change into a water-in oil emulsion as smoothly as possible, or the maximum amount of the dispersed phase remains soluble as storage or working conditions vary (e.g., temperature, shearing rate). However, sometimes even the use two surfactants fails to provide the stability demanded by manufacturers or consumers. Thus, in certain embodiments, fatty alcohols, when combined with certain non-ionic surfactants (e.g., polyols, polyethers, polyesters, glycosides, etc.) can maximize the stability of such compositions by creating a micro-emulsion (i.e., a thermodynamically stable emulsion). Fatty alcohols can also clarify formulations that tend to remain turbid at typical molten storage temperatures by raising the critical micelle concentration (cloud point or CMC) and/or the critical micelle temperature (Krafft point or CMT) of MAGs and/or the added surfactant(s). In addition, fatty alcohol co-surfactants may optimize the microstructure of marking compositions by ensuring that the processes of crystal nucleation and crystal growth remain balanced during production of a marking composition. Fatty alcohol co-surfactants may accomplish this process by reducing the viscosity of emulsified formulations. The rate of crystal growth (transfer of wax molecules or colloidal particles from the melt onto the face of nuclei) is directly proportional to the rate of diffusion, and the rate of diffusion is inversely proportional to viscosity (according to Stokes' Law), reducing the viscosity of such formulations encourages the formation of fat crystal networks (flocculated colloidal particles).

Undercooling

After the marking composition is poured into a marking composition mold, the wax may be cooled under certain conditions described as "undercooling." The degree of undercooling can be an important aspect in making a marking composition from a lipid-based wax composition if the melting temperature of one of the MAG, DAG, or TAG components in the wax composition is comparatively lower than the others. In certain embodiments, the cooling regime of the wax composition can result in an alteration of the crystallization process. In other words, it is possible for the β' phase of the wax composition to form directly during cooling of the lipid-based wax composition. However, in certain embodiments, the β phase may form directly when there is still a memory effect in the wax (i.e., the wax has not been heated sufficiently to completely melt all β crystal structure). Therefore, in certain embodiments, it is necessary to begin the cooling process (i.e., pour the wax composition) at a temperature greater than the melting point of the lipid-based wax composition of the marking composition based composition to completely melt all β crystal structure. Moreover, if the degree of undercooling is not large enough, transformation to the β phase becomes difficult to avoid due to high temperature and time forces.

Crystallization of any substance takes place as a result of two mechanisms: nucleation and crystal growth. Nucleation involves the initial formation of tiny embryonic crystals referred to as nuclei. Crystal growth is the development of the nuclei into larger crystals. Referring to lipid-based wax crystallization, crystal growth involves the diffusion of acylglycerides from the bulk solution and subsequent incorporation into the crystal lattice structure of an existing crystal or nucleus.

The rate of nucleation increases with the degree of undercooling (i.e., with decreasing temperature), which is the energetic driving force for the phase change. The rate of crystal growth, on the other hand, is also related to molecular mobility (i.e., kinetic energy) and therefore can increase with increasing temperatures achieving a maximum rate of growth at temperatures just below the melting point of the crystal being formed. Therefore the cooling conditions used will dictate both the number of nucleation sites created as well as their rate of growth. The interaction of these two modes of crystallization determines the structure and stability of the fat phase in the wax. It is believed that this defines the performance and acceptability of the wax, and by extension the marking composition, and its characteristics including fat bloom resistance.

In certain embodiments, the undercooling of the lipid-based wax composition of the marking composition is conducted at a temperature below the congeal temperature of the wax. The process begins at a temperature proximate to the molten state of the lipid-based wax composition and is then rapidly cooled at a temperature below the congeal temperature of the lipid-based wax composition. In one embodiment, the rapid cooling process begins at a temperature above approximately 65° C. (or above the congeal point temperature of the lipid-based wax composition). In one embodiment, the core temperature of the wax is lowered to a temperature that is approximately 5° C. below the congeal temperature of the lipid-based wax composition. In another embodiment, the core temperature of the wax is lowered to a temperature at least approximately 10° C. below the congeal temperature of the lipid-based wax composition.

In certain embodiments, the undercooling time period for marking composition formation is less than approximately 90 minutes, i.e., the core temperature of the marking composition is lowered to a temperature at least approximately 5° C. (or at least approximately 10° C.) less than the congeal temperature of the lipid-based wax in 90 minutes. In other embodiments, the undercooling period for marking composition formation is less than approximately 60 minutes, i.e., the core temperature of the marking composition is lowered to a temperature at least approximately 5° C. (or at least approximately 10° C.) less than the congeal temperature of the lipid-based wax in 60 minutes. In yet other embodiments, the undercooling period is less than approximately 40 minutes. In further embodiments, the undercooling period is less than about 30 minutes. In the above embodiments, the lipid-based wax composition after this undercooling period is substantially free of fat bloom.

In certain embodiments, the undercooling of the marking composition is conducted at a temperature between approximately 18° C. and approximately 33° C., between approximately 20° C. and approximately 30° C., between approximately 20° C. and approximately 25° C., or between approximately 25° C. and approximately 30° C.

In one embodiment, the marking composition substantially free of fat bloom exhibits stability against phase transformation for at least one year when stored at or below about 21° C. following the cooling of the marking composition. In another embodiment, the marking composition substantially free of fat bloom exhibits stability against phase transformation for at least one year when stored at or below 27° C. following the cooling of the marking composition. In another embodiment, the marking composition substantially free of fat bloom exhibits stability against phase transformation for at least one year when stored at or below about 32° C. following the cooling of the marking composition.

In certain embodiments, the marking composition will be substantially free of surface or internal fat bloom following an "accelerated bloom study." In one embodiment, the accelerated bloom study comprises pouring the marking composition into two molds, each being approximately 7.62 centimeters in diameter, approximately 3.81 centimeters in height, and weighing approximately 100 grams; wherein the marking composition is cooled at approximately 24° C. for at least 24 hours following the pouring, therein forming two wax ingots; wherein the wax ingots are then heated in an oven at 40.5° C.±0.5° C. for approximately 4 hours. In certain embodiments, the marking composition will be substantially free of surface or internal fat bloom by visual inspection upon removal from the oven in either of the two molds.

In certain embodiments, the mold is a crayon composition mold. In certain embodiments, the crayon composition is packaged and/or labeled with a sleeve (typically made from paper or plastic).

While the invention as described may have modifications and alternative forms, various embodiments thereof have been described in detail. It should be understood, however, that the description herein of these various embodiments is not intended to limit the invention, but on the contrary, the intention is to cover all modifications, equivalents, and alternatives falling within the spirit and scope of the invention as defined by the claims. Further, while the invention will also be described with reference to the following non-limiting examples, it will be understood, of course, that the invention is not limited thereto since modifications may be made by those skilled in the art, particularly in light of the foregoing teachings.

Example

The marking composition formulations (described below in Tables 1-3 in percent by weight) contained lipid-based wax compositions derived from soybean oil. The lipid-based wax compositions were heated to about 170° F. (77° C.) and then the 30 percent by weight talc (structuring agent) was added to the formulation and allowed to mix until completely through. FD&C pigments from Sensient (2515 N. Jefferson St., St. Louis, Mo.) were also added to each formula at 5 percent by weight to check the performance of the crayon. The marking composition was then poured into a crayon mold at a temperature of at least 5° C. greater than the congeal point of the lipid-based wax composition in the marking composition, and allowed to cool for at least 30 minutes at approximately 75° F. (24° C.). Each of the crayons was tested to see if the laydown of the marking compositions were comparable to that of commercially available crayons. Also noted during the laydown testing was whether the crayons would chip or flake during the testing.

TABLE 1

| | ID # | | | | | |
|---|---|---|---|---|---|---|
| | 1023-8 | 1023-9 | 1023-10 | 1023-11 | 1023-12 | 1023-13 |
| SC-123 | 35.0% | 20.0% | | | | 66.5% |
| Dur Em 117 | 35.0% | 40.0% | | | 70% | 3.5% |
| Palm Stearine | | | 35.0% | 20.0% | | |
| DurEm 207 | | | 35.0% | 40.0% | | |
| Talc | 30.0% | 30.0% | 30.0% | 30.0% | 30.0% | 30.0% |

TABLE 2

| | ID# | | | |
|---|---|---|---|---|
| | 209-1 | 209-2 | 209-3 | 209-4 |
| S-113 | 31.5% | 35% | 31.5% | 28% |
| S-155 | 14% | 14% | 17.5% | 21% |
| BFP 75 | 21% | 17.5% | 17.5% | 17.5% |
| BFP 65 | 3.5% | 3.5% | 3.5% | 3.5% |
| Talc | 30% | 30% | 30% | 30% |

TABLE 3

| | ID# | | | |
|---|---|---|---|---|
| | 113-1 | 113-2 | 113-3 | 113-4 |
| SC-123 | 31.5% | 35% | 31.5% | 28% |
| S-155 | 14% | 14% | 17.5% | 21% |
| BFP 75 | 21% | 17.5% | 17.5% | 17.5% |
| BFP 65 | 3.5% | 3.5% | 3.5% | 3.5% |
| Talc | 30% | 30% | 30% | 30% |

The MAG, DAG, and TAG components for each of these ID numbers in Tables 1-3 are described below:
SC-123=100% Partially Hydrogenated TAG
S-113=100% Partially Hydrogenated TAG
S-155=100% Fully Hydrogenated TAG
BFP*75=57 wt % MAG, 32 wt % DAG, 7 wt % TAG (fully hydrogenated)
BFP*65=57 wt % MAG, 32 wt % DAG, 7 wt % TAG (partially hydrogenated)
Palm stearine=100% TAG (non-hydrogenated)
DurEm 207=57 wt % MAG, 32 wt % DAG, 7 wt % TAG (fully hydrogenated)
DurEm 117=43 wt % MAG, 44 wt % DAG, 12 wt % TAG (fully hydrogenated)

The performance of the marking composition was based on five areas: 1) ease of release from the mold, 2) fat bloom of the wax, 3) cracking of the marking composition upon removal from the mold, 4) relative hardness of the marking composition, and 5) laydown performance of the marking composition. Performance was rated on a scale of 1-5 (wherein 1=least favorable performance, 5=most favorable performance). Results are shown below in Table 4.

TABLE 4

| | 113-1 | 113-2 | 113-3 | 113-4 | 209-1 | 209-2 | 209-3 | 209-4 |
|---|---|---|---|---|---|---|---|---|
| Mold Release | 4 | 4 | 5 | 5 | 4 | 4 | 5 | 5 |
| Fat Bloom | 5 | 5 | 5 | 5 | 5 | 5 | 5 | 5 |
| Cracking | 5 | 5 | 5 | 5 | 5 | 5 | 5 | 5 |
| Relative Hardness | 2 | 3 | 4 | 5 | 2 | 3 | 4 | 5 |
| Overall Performance | 4 | 4 | 5 | 5 | 4 | 4 | 5 | 5 | wherein:
Mold Release: 1 = No release from Mold → 5 = Total release in 30 minutes
Fat Bloom: 1 = completely covered in fat bloom → 5 = No fat bloom noted
Cracking: 1 = Excessive Cracking → 5 = No cracking noted
Relative Hardness: 1 = Extremely soft → 5 = Very hard
Overall Performance: 1 = Very poor → 5 = Good Performance By varying the types and amounts of TAGs, DAGs, and MAGs a difference in the performance could be seen. Increasing the amount of fully hydrogenated natural oil in mixture affected the relative hardness and ease of mold removal of the marking composition while also changing the laydown of the composition. Varying the ratio of MAG/DAG to TAG affected the fat bloom in the product. The laydown and cracking can be affected in the marking composition by varying the level of hydrogenation in the MAG/DAG composition that is used.

In certain embodiments, a marking composition of 0-70 percent by weight partial hydrogenated TAG, 0-40 percent by weight fully hydrogenated TAG, and 2-100 percent by weight MAG/DAG are preferred. Upon testing in the ranges listed above, it was found that fat bloom and cracking were decreased with the addition of 3.5 percent by weight or more of the MAG/DAG. It was also noted that the addition of the fully hydrogenated TAG at 10 percent by weight level or more helped with the relative hardness of the marking composition also improving the laydown of the marking composition.

What is claimed is:

1. A marking composition comprising:
    a lipid-based wax composition and a structuring agent wherein the lipid-based wax composition and the structuring agent consist of approximately 15-75 percent by weight triacylglycerides, approximately 2-75 percent by weight monoacylglycerides and diacylglycerides combined, and approximately 1-40 percent by weight of the structuring agent,
    wherein the monoacylglycerides, diacylglycerides, triacylglycerides, and structuring agent add up to 100 percent.

2. The marking composition of claim 1, wherein the lipid-based wax composition and the structuring agent consist of approximately 40-60 by weight of the triacylglycerides, approximately 15-25 percent by weight of the monoacylglycerides and the diacylglycerides combined, and approximately 25-35 percent by weight of the structuring agent.

3. The marking composition of claim 1, wherein the lipid-based wax composition and the structuring agent consist of approximately 47-51 by weight of the triacylglycerides, approximately 19-23 percent by weight of the monoacylglycerides and the diacylglycerides combined, and approximately 28-32 percent by weight of the structuring agent.

4. The marking composition of claim 3, wherein the marking composition is free of surface or internal fat bloom following an accelerated bloom study wherein:
    the marking composition, at an elevated temperature above 24° C., is poured into two molds, each being approximately 7.62 centimeters in diameter, approximately 3.81 centimeters in height, and weighing approximately 100 grams;
    the marking composition is then cooled at approximately 24° C. for at least 2 hours following the pouring, therein forming two wax ingots;
    the wax ingots are then heated in an oven at 40.5° C.±0.5° C. for approximately 4 hours; and
    the two molds are removed from the oven, upon which either of the two molds is free of surface or internal fat bloom by visual inspection.

5. The marking composition of claim 1, wherein the monoacylglycerides, diacylglycerides, and triacylglycerides are derived from natural oils selected from the group consisting of canola oil, rapeseed oil, coconut oil, corn oil, cottonseed oil, olive oil, palm oil, peanut oil, safflower oil, sesame oil, soybean oil, sunflower oil, linseed oil, palm kernel oil, tung oil, jatropha oil, mustard oil, camellina oil, pennycress oil, hemp oil, algal oil, castor oil, lard, tallow, poultry fat, yellow grease, fish oil, tall oils, and mixtures thereof.

6. The marking composition of claim 1, wherein the structuring agent is selected from the group consisting of calcium carbonate, titanium dioxide, talc, silica, clay, feldspar, corn starch, alumina, mica, and mixtures thereof.

7. The marking composition of claim 1, wherein the structuring agent is talc.

8. The marking composition of claim 1, wherein the marking composition further comprises at least one additive selected from the group consisting of wax-fusion enhancer additives, colorants, scenting agents, migration inhibitors, free fatty acids, additional optimal wax ingredients, surfactants, co-surfactants, emulsifiers, metals, glitter, cleanability additives, foam inhibitors, mold release agents, individually or in combinations thereof.

9. The marking composition of claim 8, having between approximately 0.1 percent by weight and approximately 45 percent by weight of the at least one additive.

10. The marking composition of claim 1, wherein the marking composition further comprises a colorant.

11. The marking composition of claim 10, having between approximately 0.1 percent by weight and approximately 20 percent by weight of the colorant.

12. The marking composition of claim 1, wherein the marking composition is a crayon having an outer sleeve.

13. The marking composition of claim 1, wherein the marking composition is free of surface or internal fat bloom following an accelerated bloom study wherein:
   the marking composition, at an elevated temperature above 24° C., is poured into two molds, each being approximately 7.62 centimeters in diameter, approximately 3.81 centimeters in height, and weighing approximately 100 grams;
   the marking composition is then cooled at approximately 24° C. for at least 2 hours following the pouring, therein forming two wax ingots;
   the wax ingots are then heated in an oven at 40.5° C.±0.5° C. for approximately 4 hours; and
   the two molds are removed from the oven, upon which either of the two molds is free of surface or internal fat bloom by visual inspection.

14. The marking composition of claim 1, wherein the marking composition is free of fat bloom when formed by the process of:
   (a) blending the lipid-based wax composition and the structuring agent by heating the lipid-based wax composition at a sufficiently high temperature to destroy substantially all crystal structure within the lipid-based wax composition;
   (b) pouring the lipid-based wax composition and the structuring agent into a mold having a surface and a core, wherein the pouring is conducted at a temperature at least 5° C. greater than the congeal point of the lipid-based wax composition,
   (c) subsequently cooling the mold under conditions sufficient to cool the core of the mold at least 5° C. below the congeal point of the lipid-based wax composition in approximately 30-90 minutes, forming a solid marking composition; and
   (d) removing the solid marking composition from the mold, wherein the solid marking composition is free of surface or internal fat bloom by visual inspection following the removing step.

15. The marking composition of claim 14, wherein the lipid-based wax composition and the structuring agent consist of approximately 40-60 by weight of the triacylglycerides, approximately 15-25 percent by weight of the monoacylglycerides and the diacylglycerides combined, and approximately 25-35 percent by weight of the structuring agent.

16. The marking composition of claim 14, wherein the lipid-based wax composition and the structuring agent consist of approximately 47-51 by weight of the triacylglycerides, approximately 19-23 percent by weight of the monoacylglycerides and the diacylglycerides combined, and approximately 28-32 percent by weight of the structuring agent.

17. The marking composition of claim 14, wherein the marking composition optionally comprises at least one additive selected from the group consisting of wax-fusion enhancer additives, colorants, scenting agents, migration inhibitors, free fatty acids, additional optimal wax ingredients, surfactants, co-surfactants, emulsifiers, metals, glitter, cleanability additives, foam inhibitors, mold release agents, individually or in combinations thereof.

18. The marking composition of claim 14, wherein the cooling occurs at a temperature between approximately 18° C. and approximately 33° C.

19. The marking composition of claim 14, wherein the cooling is conducted without the assistance of a fan.

20. The marking composition of claim 14, wherein the cooling is conducted with the assistance of a fan.

21. The marking composition of claim 14, wherein the composition further comprises a colorant.

22. The marking composition of claim 14, wherein mold has an inner diameter of larger than approximately 8 mm and height greater than approximately 85 mm.

23. A method of making a marking composition that is free of fat bloom, the method comprising:
   providing a lipid-based wax composition and a structuring agent consisting of approximately 15-75 percent by weight triacylglycerides, approximately 2-75 percent by weight monoacylglycerides and diacylglycerides, and approximately 25-35 percent by weight of a structuring agent, wherein the monoacylglycerides, diacylglycerides, triacylglycerides, and structuring agent add up to 100 percent;
   blending the lipid-based wax composition and structuring agent by heating the lipid-based wax composition and the structuring agent at a sufficiently high temperature to destroy substantially all crystal structure within the lipid-based wax composition;
   pouring the lipid-based wax composition and the structuring agent into a mold having a surface and a core, wherein the pouring is conducted at a temperature at least 5° C. greater than the congeal point of the lipid-based wax composition,
   subsequently cooling the mold under conditions sufficient to cool the core of the mold at least 5° C. below the congeal point of the lipid-based wax composition in approximately 30-90 minutes, forming a solid marking composition; and
   removing the solid marking composition from the mold, wherein the solid marking composition is free of surface or internal fat bloom by visual inspection following the removing step.

24. The method of claim 23, wherein the blending comprises a first blending of the monoacylglycerides and the diacylglycerides to form a mixture of monoacylglycerides and diacylglycerides, followed by a second blending of the mixture of monoacylglycerides and diacylglycerides with the triacylglycerides.

25. The method of claim 23, wherein the monoacylglycerides and the diacylglycerides are distilled prior to the blending with the triacylglycerides.

26. The method of claim 23, wherein the cooling of the lipid-based wax composition is conducted at a temperature between approximately 18° C. and approximately 33° C.

27. The method of claim 23, wherein the marking composition is a crayon and the method further comprises labeling the crayon with an outer sleeve.

28. A method of making a marking composition that is free of fat bloom, the method comprising:
   providing a structuring agent and a lipid-based wax composition having triacylglycerides, diacylglycerides, and monoacylglycerides, present in a ratio of 47-51 parts of the triacylglycerides to 19-23 parts of the monoacylglycerides and the diacylglycerides combined to 28-32 parts of the structuring agent;

blending the lipid-based wax composition by heating the lipid-based wax composition at a sufficiently high temperature to destroy substantially all crystal structure within the lipid-based wax composition;

pouring the lipid-based wax composition into a mold having a surface and a core, wherein the pouring is conducted at a temperature at least 5° C. greater than the congeal point of the lipid-based wax composition;

subsequently cooling the mold under conditions sufficient to cool the core of the mold at least 5° C. below the congeal point of the lipid-based wax composition in approximately 30-90 minutes, forming a solid marking composition; and removing the solid marking composition from the mold, wherein the solid marking composition is free of surface or internal fat bloom by visual inspection following the removing step.

* * * * *